April 30, 1940.    A. STOBB    2,198,747
POWER TRANSMISSION MECHANISM
Filed Dec. 22, 1938
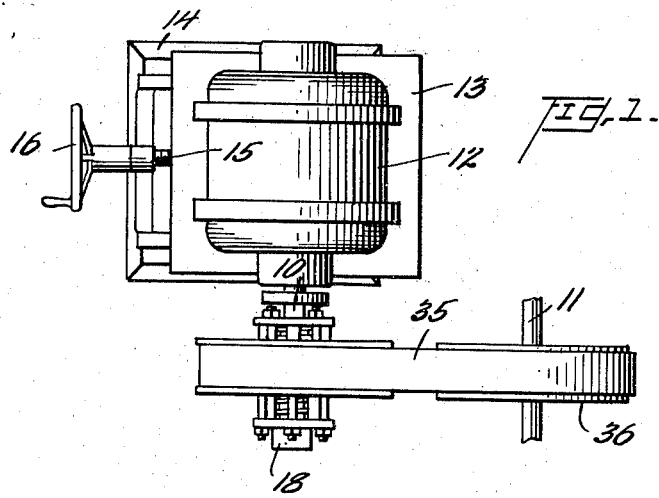
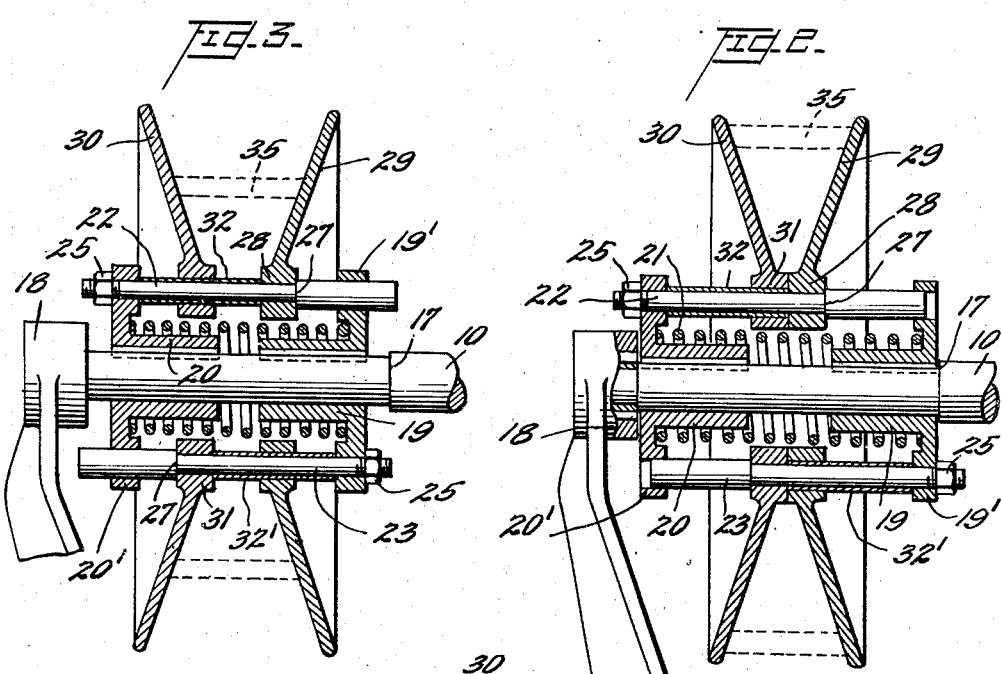
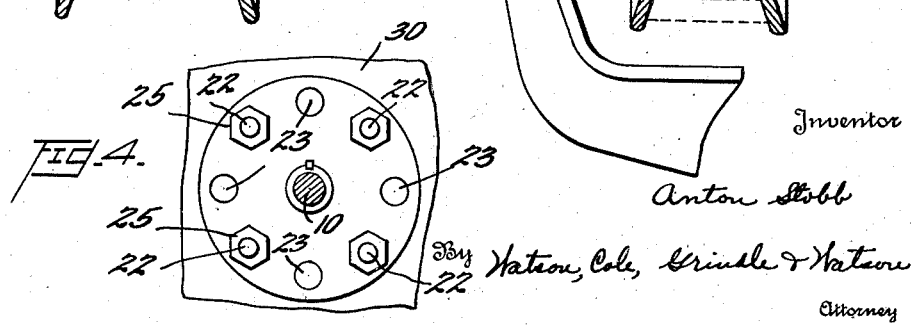
Inventor
Anton Stobb
By Watson, Cole, Grindle & Watson
Attorney Patented Apr. 30, 1940

2,198,747

UNITED STATES PATENT OFFICE 2,198,747

POWER TRANSMISSION MECHANISM

Anton Stobb, Elizabeth, N. J., assignor to American Type Founders, Inc., Elizabeth, N. J., a corporation of New Jersey Application December 22, 1938, Serial No. 247,274

6 Claims. (Cl. 74—230.17)

The present invention relates to power transmission mechanisms, more particularly to that type of power transmission mechanism which is generally designated a variable speed drive. The variable speed drive, broadly speaking, includes in combination with driving and driven shafts, means connecting the shafts, at all times, in such manner that power may be communicated from the driving shaft to the driven shaft, this connecting means, however, permitting the relative speeds of rotation of these shafts to be readily adjusted, whenever desired, without severing the driving connection.

Thus in a well-known type of variable speed drive pulleys are mounted upon the driving and driven shafts, respectively, and an endless belt is provided for operatively connecting these pulleys. One pulley is of ordinary type and is positively secured to the shaft upon which it is mounted so as to be rotatable therewith. the other pulley comprising essentially two members with mutually facing conical surfaces defining an annular groove with outwardly flaring walls for the reception of the belt, one only of these members being affixed upon the associated shaft and the other being slidable on such shaft but normally urged toward and into contact with the first member by resilient means such as a spring. The belt employed is of the V-type, the edges of the belt bearing against the inner faces of the cone faced members; and one of the shafts, generally the driving shaft, is mounted for movement toward and away from the driven shaft. When the driving shaft is moved away from the driven shaft the diameter of that portion of the connecting belt which is in engagement with the relatively movable cone faced members becomes smaller, these members being thrust apart against the action of the resilient means, and hence the speed of the driven shaft decreased with respect to the speed of the driving shaft. When the two shafts are caused to approach each other the diameter of that portion of the belt which is in engagement with the driving pulley increases due to the conjoint action of the cone faced members acting under the influence of the resilient means which urges them towards each other, and hence the speed of the driven shaft increased with respect to that of the driving shaft, the driving shaft being generally driven at uniform angular velocity as by means of an electric motor.

The fact that one of the cone faced members is fixed to the driving shaft and the second is slidable thereon, however, causes the belt to move longitudinally of the driving shaft slightly when speed varying adjustments are effected, thus throwing the belt somewhat out of alignment in certain of its positions, the driven pulley being in fixed position and not moving longitudinally of the driven shaft. It has been found necessary or desirable in the utilization of variable speed driving mechanisms of the type just described to arrange the driving and driven shafts at a slight angle to each other, instead of disposing them in strict parallelism, to avoid twisting of the belt for certain adjustments of the driving pulley. Disposing the shafts out of exact parallelism with each other increases the cost and difficulty of assembly and is generally undesirable. Likewise movement of the connecting belt longitudinally of the driving shaft when adjustments of the driving pulley are effected causes the opposite edges of the belt to engage conical surfaces which, in effect, are moving at slightly different speeds, thus increasing wear.

In accordance with the present invention an improved type of variable speed driving mechanism is provided in which the driving pulley, while freely permitting all desired adjustments of belt diameter, is self-aligning, both cone faced members of the pulley being longitudinally movable along the driving shaft. Hence the difficulties heretofore met with in the use of generally similar types of driving pulleys, but in which one of the coned faced members is positively secured to the driving shaft, are wholly avoided. The driving and driven shafts may be disposed in perfect parallelism and there is never any belt twisting from any cause, regardless of the extent of adjustment of the driving pulley. By making both cone faced members of the driving pulley longitudinally adjustable on the driving shaft it is possible to more conveniently position the resilient means or spring which is made use of to normally urge these members toward each other and to yieldingly oppose their separation under the pressure of an intermediate belt.

The cone shaped members of the pulley encircle the driving shaft but do not contact with it, both being mounted upon rods disposed parallel to the driving shaft, these rods in turn having their ends supported upon hubs slidable on the shaft, the spring being disposed so as to encircle the shaft intermediate the hubs. Customarily the spring is mounted exteriorly of the pulley, and the spring and its mounting, thus projecting axially of the driving pulley for a substantial distance, are easily injured by contact with other bodies and objectionable in that they protrude into and occupy space which may be advantageously used for other purposes. The improved variable speed drive likewise has other advantages, which will be hereinafter set forth. In its details of construction the novel mechanism may be considerably varied in adapting the invention to various fields of usefulness and it will be understood that that form which is illustrated in the accompanying drawing, and which will now be specifically described, is set forth by way of example only.

In the drawing:

Figure 1 is a top plan view of the variable speed drive, showing the driving motor and shaft, driven shaft, and the driving and driven pulleys;

Figure 2 is an axial section through the driving pulley;

Figure 3 is a similar section but showing the cone faced members of the driving pulley in different relative positions from those in which they are shown in Figure 2; and Figure 4 is an end elevation of portion of the driving pulley.

Referring first to Figure 1. The driving shaft is indicated at 10 and the driven shaft at 11, these shafts being maintained in parallelism at all times. The driving shaft 10 is, however, mounted for movement toward and away from the driven shaft 11 without destroying the parallel relationship of the shafts, the driving shaft being in the usual case coupled directly to the shaft of a motor, such as 12, which motor is mounted on a base 13 and motor base 13 being in turn supported for sliding movement in a direction transverse to the axes of the driving and driven shafts upon a support 14. Sliding movement of the motor and its base 13 upon the support 14 may be effected by means of a screw 15 upon the end of which is fixed a hand wheel 16, rotation of the hand wheel and screw producing a slow movement of the motor base and motor and these last mentioned parts being maintained in fixed position by the adjusting means when no adjustment is being effected. The details of the adjusting means comprises no portion of the present invention and any suitable adjusting means may be employed.

The details of the driving pulley of the power transmission mechanism will be most clearly seen in Figures 2 and 3. The driving shaft 10 is provided with a portion of reduced diameter intermediate a shoulder 17 formed thereon and a supporting bearing 18. Hubs 19 and 20 of the driving pulley are slidably mounted upon this portion of shaft 10 and each hub is splined to the shaft so that both hubs will rotate with the shaft at all times although each may be moved longitudinally thereon. A coil spring 21 encircles the hubs, the ends of these springs resting, respectively, against the annular flanges 19' and 20' at the outer ends of hubs 19 and 20, respectively. The annular flanges 19' and 20' support a circular series of rods, the axes of which are parallel to the axis of the driving shaft 10 and are equidistantly spaced from this axis. Two of these rods are indicated at 22 and 23 in Figures 2 and 3 of the drawing. It will be perceived that the rods are similar in construction and dimension but are reversed with respect to each other and from Figure 4 it will be observed that there are four of the rods 22 and four of the rods 23, the rods 22 alternating with the rods 23. Each rod 22 extends through a cylindrical aperture formed in flange 20' of hub 20 and the projecting end of this rod is threaded to receive a securing nut 25. Its opposite end slidably fits within a cylindrical aperture formed in flange 19' of hub 19 and at this end rod 22 is of larger diameter than at the opposite end, the rod having a shoulder 27 at the junction between its sections of larger and smaller diameter.

Shoulder 27 bears against the outer face of the inner annular marginal flange 28 of cone faced member 29 through which flange the reduced portion of the rod passes. The second cone faced member 30 is likewise provided with an inner marginal flange 31 having an aperture to receive rod 22 and a spacing sleeve 32 which encircles the rod. The spacing sleeve 32 has one end in engagement with the inner face of flange 20' of hub 20 and its opposite end in engagement with the inner marginal flange 28 of the cone faced member 29. Hence it is clear that the cone faced member 29 may not slide upon rod 22, the opposite faces of the flange 28 of this member being engaged by the shoulder 27 integral with the rod and by the end of the sleeve 32 which is immovable longitudinally of the rod. However, the complimentary cone faced member 30 is freely slidable upon the exterior of the spacing sleeve 32 mounted upon rod 22.

Referring now to the rod 23 it will be perceived that this rod is formed similarly to rod 22, but that it is reversed in position, the cone faced member 30 being movable with rod 23, and hence movable with hub 19, and the complimentary cone faced member 29 being slidable upon the spacing sleeve 32' which encircles this rod.

The V-belt connecting the driving and driven pulleys is indicated at 35 and may be of any satisfactory type well known in the art. That portion of the belt which engages the driving pulley may be of relatively large diameter, as indicated in Figure 2, or its diameter may be decreased, as indicated in Figure 3, decrease in diameter of this portion of the belt being effected by movement of driving shaft 10 away from driven shaft 11, the belt being thus drawn downwardly into the V-shaped groove intermediate the cone faced members 29 and 30, and these members being separated to an extent proportional to the decrease in diameter of the belt. Separation of the members 29 and 30 is normally opposed by the action of spring 21 but this spring is of such character as to permit the desired inward adjustment of the belt. When the belt diameter is at its greatest the flanges 28 and 31 of the cone faced members 29 and 30 are in contact and the outer ends of hubs 19 and 20 are in contact with or close to the shoulder 17 and the inner face of bearing 18, respectively.

As the belt is adjusted inwardly, however, for instance to the position shown in Figure 3, hubs 19 and 20 no longer contact with the shoulder 17 of the shaft 10 and the inner face of bearing 18, the pulley being slidable longitudinally on the shaft to a limited extent and thus able to align itself perfectly with respect to the driven pulley 36 if influenced to do so by the tension in the belt. When the shaft 10 is moved toward the shaft 11 the spring 21 automatically acts equally upon both cone faced members 29 and 30 to cause these members to coact in increasing the diameter of that portion of the belt with which they are engageable. Hence the mechanism described accomplishes all of the functions of the usual type of variable speed driving mechanism in which the driving pulley comprises oppositely facing cone faced members while at the same time it is self-aligning, prevents belt distortion, has no protruding spring and hence is more compact, and is more durable and long lasting.

Having thus described the invention, what is claimed as new and desired to be secured by Letters Patent is:

1. In a pulley for a variable speed drive, in combination, a shaft, two members encircling the shaft and having mutually facing conical surfaces defining an annular groove with outwardly diverging walls for the reception of a belt, hubs slidably mounted on the shaft and connected thereto for rotation therewith, resilient means normally urging said hubs in opposite directions longitudinally of the shaft, a plurality of rods disposed parallel to said shaft upon which said members are mounted, the ends of said rods being supported by said hubs, the said resilient means opposing separation of said members.

2. In a pulley for a variable speed drive, in combination, a shaft, two members encircling the shaft and having mutually facing conical surfaces defining an annular groove with outwardly diverging walls for the reception of a belt, hubs slidably mounted on the shaft and connected thereto for rotation therewith, a spring intermediate the hubs and normally urging them apart, and means mounting said members on said hubs, said means supporting both members for rotation with the hubs and connecting each member to one hub for movement simultaneously therewith longitudinally of the shaft.

3. In a pulley for a variable speed drive, in combination, a shaft, two members encircling the shaft and having mutually facing conical surfaces defining an annular groove with outwardly diverging walls for the reception of a belt, hubs slidably mounted on the shaft and connected thereto for rotation therewith, a spring intermediate the hubs and normally urging them apart, and a plurality of rods disposed parallel to said shaft the ends of which are mounted on said hubs, each rod being movable with one hub and slidable with respect to the other, and said members being mounted on said rods, each member being slidable on certain of said rods and movable with other rods.

4. In a pulley for a variable speed drive, in combination, a shaft, two members encircling the shaft and having mutually facing conical surfaces defining an annular groove with outwardly diverging walls for the reception of a belt, a series of rods disposed parallel to the shaft upon which said members are supported, each rod slidably supporting one member and positively engaging the other and alternate rods positively engaging the same member, means for supporting said rods and means for urging alternate rods in opposite directions.

5. In a pulley for a variable speed drive, in combination, a shaft, two members encircling the shaft and having mutually facing conical surfaces defining an annular groove with outwardly diverging walls for the reception of a belt, a plurality of rods disposed in a circular series around the shaft and each parallel to the shaft, each rod passing through aligned apertures in said members, alternate rods having shoulders positively engaging the outer face of one member and intermediate rods having shoulders positively engaging the outer face of the other member, means supporting said rods for rotation with the shaft and means normally urging said alternate sets of rods in opposite directions to draw said members toward each other at all times.

6. In a pulley for a variable speed drive, in combination, a shaft, two members encircling the shaft and having mutually facing conical surfaces defining an annular groove with outwardly diverging walls for the reception of a belt, a plurality of rods disposed in a circular series around the shaft and each parallel to the shaft, each rod passing through aligned apertures in said members, alternate rods having spaced shoulders positively engaging the respective sides of one member and intermediate rods having spaced shoulders positively engaging the respective sides of the other member, each rod passing freely through the apertures of the member with which its is not engaged, hubs supporting said rods for rotation with the shaft and means normally urging said alternate sets of rods in opposite directions to draw said members toward each other at all times.

ANTON STOBB.